United States Patent [19]
Fukushima

[11] Patent Number: 5,923,373
[45] Date of Patent: Jul. 13, 1999

[54] COMMUNICATION SYSTEM FOR COMMUNICATING BETWEEN TWO MICROCOMPUTERS

[75] Inventor: Nobuo Fukushima, Kanagawa-ken, Japan

[73] Assignee: Canon Kabushiki Kaisha, Tokyo, Japan

[21] Appl. No.: 08/368,394

[22] Filed: Jan. 3, 1995

Related U.S. Application Data

[63] Continuation of application No. 08/168,925, Dec. 17, 1993, abandoned, which is a continuation of application No. 08/074,994, Jun. 10, 1993, abandoned, which is a continuation of application No. 07/730,635, Jul. 16, 1991, abandoned.

[30] Foreign Application Priority Data

Jul. 20, 1990 [JP] Japan .................................. 2-192676
Jul. 31, 1990 [JP] Japan .................................. 2-204783

[51] Int. Cl.[6] ................................................. H04N 5/225
[52] U.S. Cl. .......................... 348/372; 348/207; 348/375
[58] Field of Search .................................. 348/207, 372, 348/373, 374, 375, 376, 211, 96, 97, 98; 354/401; 396/297, 298, 300, 301, 303, 529, 544, 91, 48, 71; 355/40; 455/418, 419, 420; H04N 5/235

[56] References Cited

U.S. PATENT DOCUMENTS

| | | | |
|---|---|---|---|
| 4,450,487 | 5/1984 | Koipe | 358/335 |
| 4,549,219 | 10/1985 | Sue et al. | 370/438 |
| 4,755,990 | 7/1988 | Bohler et al. | 370/438 |
| 4,860,113 | 8/1989 | Miyamoto | 348/349 |
| 4,881,128 | 11/1989 | Yamada | 358/228 |
| 4,945,424 | 7/1990 | Hiroki et al. | 358/335 |
| 4,989,085 | 1/1991 | Elberbaum | 348/211 |
| 5,057,927 | 10/1991 | Hieda | 348/349 |
| 5,210,826 | 5/1993 | Takeda et al. | 370/282 |

*Primary Examiner*—Tuan V. Ho
*Attorney, Agent, or Firm*—Robin, Blecker & Daley

[57] ABSTRACT

A communication system includes a first microcomputer disposed in a body, a second microcomputer disposed in an accessory device which can be detachably attached to the body, and a switching circuit for selectively switching a part of communication lines provided between the first and second microcomputers between an open state and a low-level state. The switching circuit controls an operation of at least one of the first and second microcomputers.

12 Claims, 6 Drawing Sheets

COMMUNICATION SYSTEM FOR COMMUNICATING BETWEEN TWO MICROCOMPUTERS

This is a continuation application under 37 CFR 1.62 of prior application Ser. No. 08/168,925 filed Dec. 17, 1993 (aban.) which is a cont. of Ser. No. 08/074,994 filed Jun. 10, 1993 (aban.) which is a cont. of Ser. No. 07/730,635 filed Jul. 16, 1991 (aban.)

BACKGROUND OF THE INVENTION

1. Field of the Invention

The present invention relates generally to communication systems, and pertains more particularly to a communication system suitable for use in an SV camera (electronic still video camera) or the like.

2. Description of the Related Art

Figure 1:
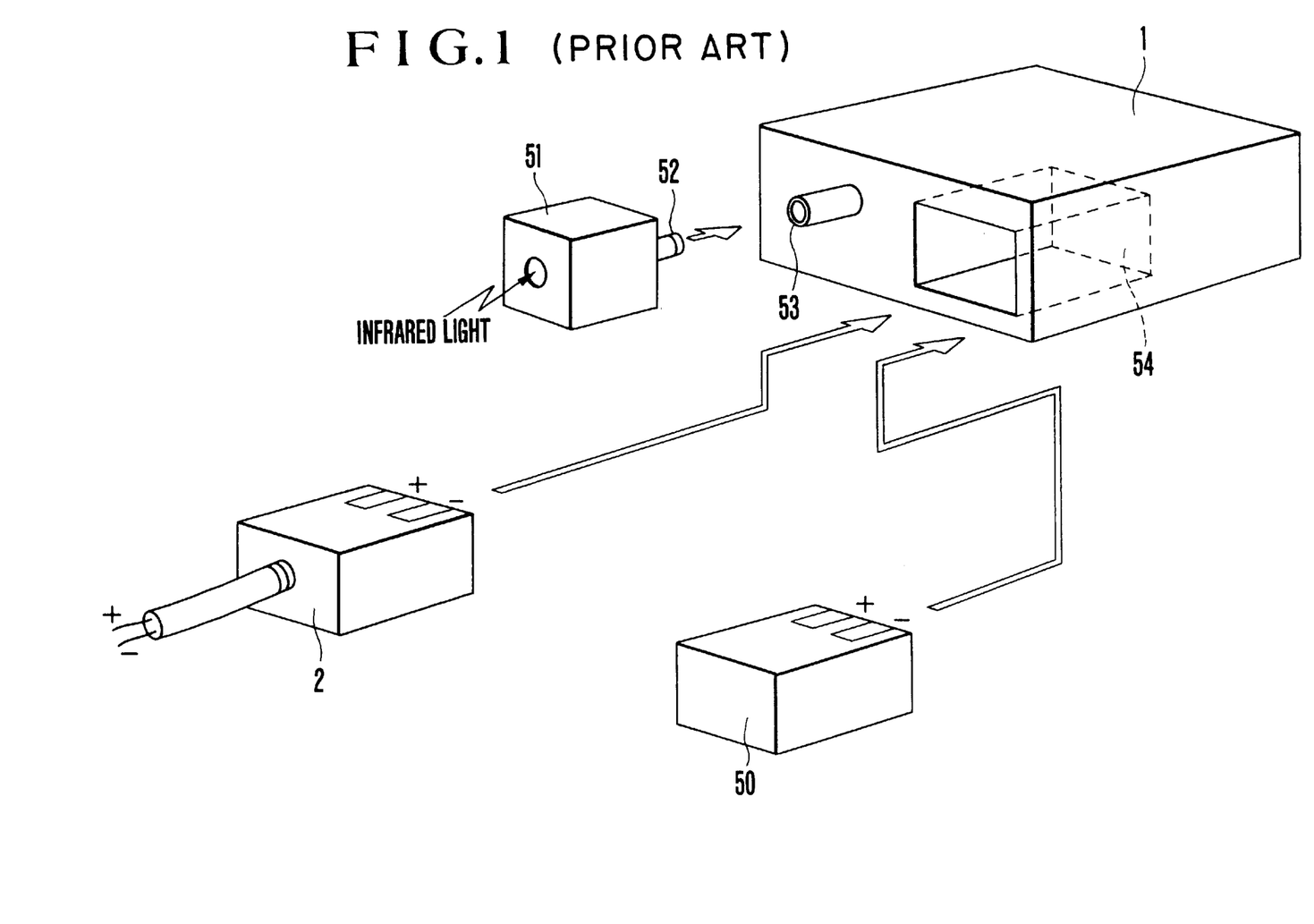
FIG. 1 is a schematic view showing a conventional example.

To convert external AC power into DC power to be supplied as electric power, a conventional SV camera or the like has an arrangement such as that shown in FIG. 1. In the shown arrangement, a coupler 2 is fitted into a portion 54 for accommodating a dedicated battery 50 for a camera body 1 so that electrical power can be supplied thereto through electric contacts which are also available for supplying electrical power from the dedicated battery 50.

In the field of such an SV camera, there has also been a need for a wireless remote-control function or other similar means for externally controlling the SV camera.

In wireless remote control, it is necessary that a sensor for receiving infrared light from a wireless remote controller and a CPU for decoding received data be disposed somewhere in the system.

To meet the necessity, in general, a light receiving sensor 51 is disposed on the camera body 1 as shown in FIG. 1 and the CPU of the camera body 1 directly receives and decodes an output from the light receiving sensor 51. In FIG. 1, the light receiving sensor 51 can be detachably attached to the camera body 1, and elements 52 and 53 constitute a plug and socket.

In the above-described example, to enable the camera body 1 to receive a signal from the wireless remote controller, the power supply of the camera body 1 must be on at all times. As a result, even in a case where the SV camera has not been operated by the use of wireless remote control, it is impossible to utilize what is called automatic shut-off, i.e., the function of automatically shutting off the power supply. This is undesirable in that if a user forgets to turn off the power supply, more electric power will be consumed than is necessary.

In addition, the above-described conventional example has the following disadvantages:

(1) The size of the camera body becomes larger by the size of the light receiving sensor.

(2) The cost of the camera body increases.

(3) The current consumption of the camera body increases.

(4) Processing load applied to the CPU of the camera body increases.

SUMMARY OF THE INVENTION

It is, therefore, an object of the present invention to solve the above-described problems.

To achieve the above-described object, according to one aspect of the present invention, a power supply coupler which can be detachably attached to a body for supplying electric power to the same includes a sensor disposed in the power supply coupler for receiving a signal from a remote controller.

Accordingly, it is possible to reduce the size of a camera body, power consumption, and the load of a microcomputer in the camera body and, in addition, the number of functions which can be incorporated into a single camera body can be increased.

In accordance with another aspect of the present invention, the operation of a microcomputer in either an accessory device or a body is controlled in accordance with the open state or the low-level state of a part of communication lines between the microcomputer of the accessory device and that of the body. Accordingly, it is possible to reduce the number of connections between the accessory device and the body as well as power consumption.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 2:
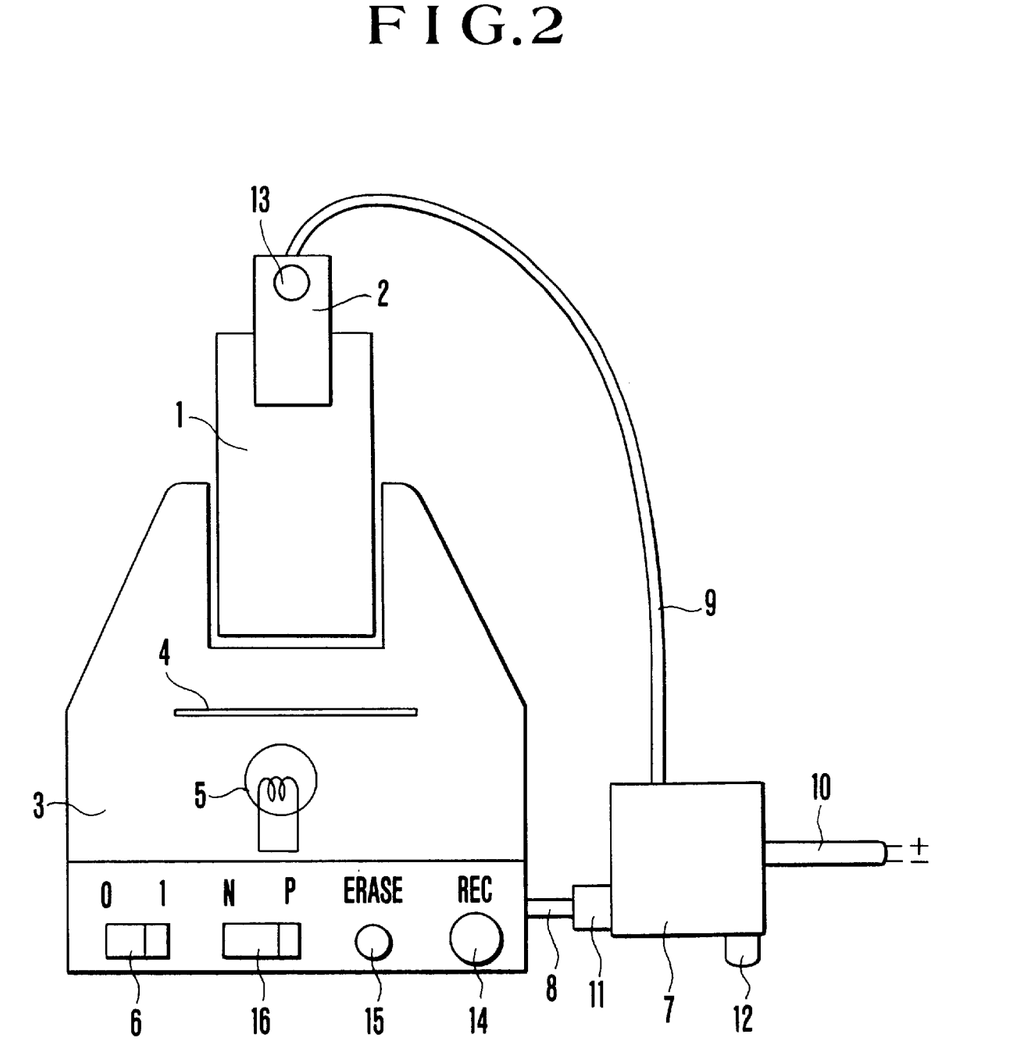
FIG. 2 is a schematic view showing the arrangement of one embodiment of the present invention.
Figure 3:
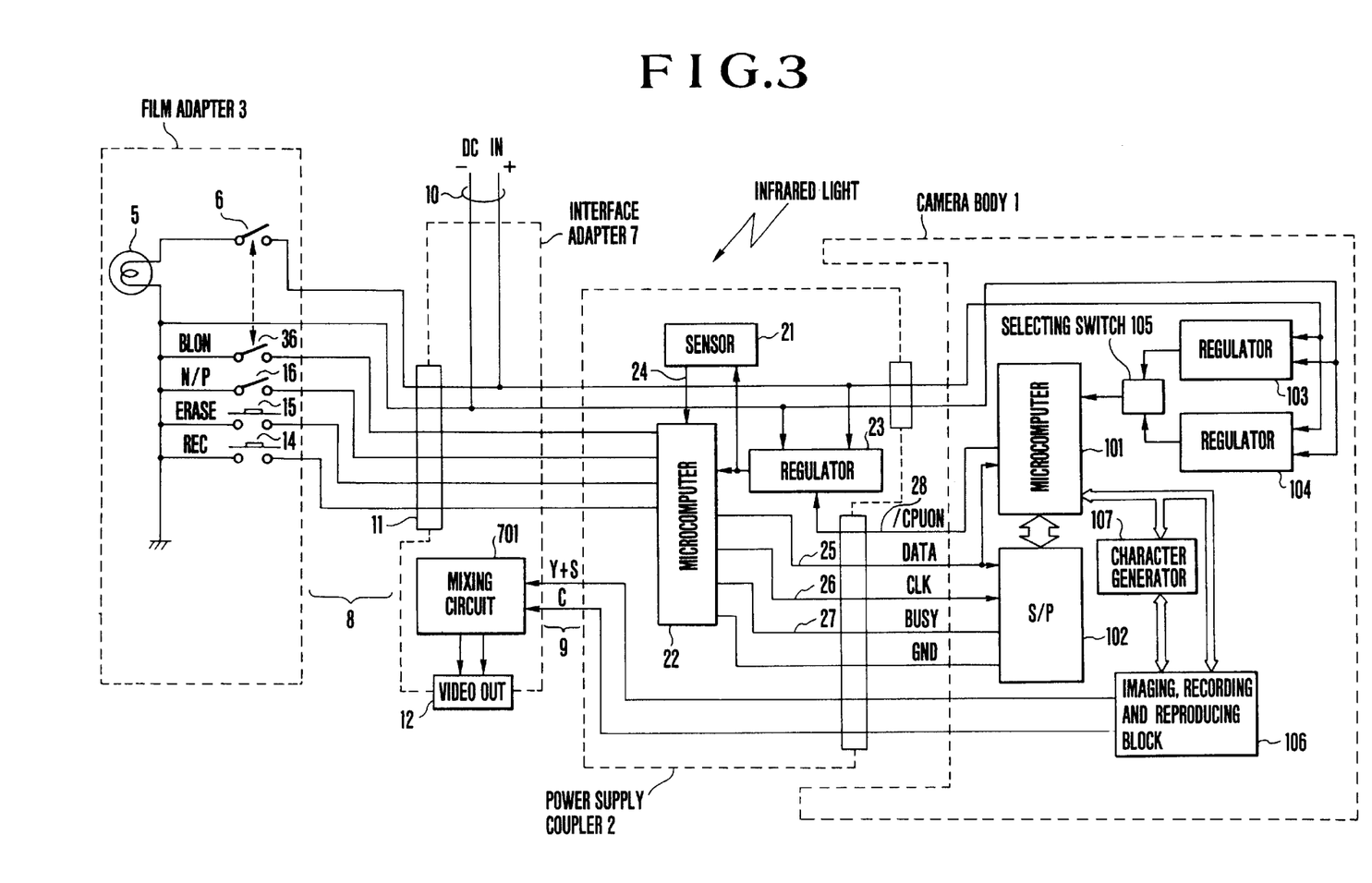
FIG. 3 is a detailed block diagram showing the embodiment shown in FIG. 2.

FIGS. 2 and 3 are diagrammatic views showing an example of an SV camera which has a wireless remote-control function and a film imaging function in addition to normal functions. The term "film imaging function" used herein means the function of imaging and recording, through an SV camera body, negative or positive images formed on a negative or positive film which has been exposed by means of a general silver salt camera.

The arrangement shown in FIG. 2 includes a camera body 1 and a power supply coupler 2 which can be detachably attached to the camera body 1. FIG. 2 shows that the power supply coupler 2 is attached to the camera body 1.

The arrangement also includes a film adapter 3, a film which is shown at 4 in the film adapter 3, an illumination lamp 5, and switches 6, 14, 15 and 16. Cables 8, 9 and 10 are connected to an interface adapter 7.

The cable 8 connects the film adapter 3 to the interface adapter 7, and includes a power source line and other lines which are connected to the respective switches 6, 14, 15 and 16 of the film adapter 3.

The cable 9 connects the power supply coupler 2 to the interface adapter 7, and includes, in addition to the lines of the cable 8, a video signal line, etc.

The cable 10 is a DC power source line.

The interface adapter 7 has a connector 11 for detachably attaching the cable 8 to the interface adapter 7, and a video output terminal 12.

The power supply coupler 2 is provided with a light receiving window 13 for receiving a remote-control signal, such as infrared light or the like, from a wireless remote controller which is not shown.

When an image on the film 4 is to be imaged and recorded, the camera body 1 is attached to the film adapter 3, as shown in FIG. 2, and the film 4 is set and the illumination lamp 5 is lit up. Thus, the image on the film 4 is imaged through a normal photographic lens optical system (not shown) of the camera body 1, and is then recorded in the camera body 1 by turning on the switch 14 provided on the film adapter 3.

Details of the circuit of each of the camera body 1, the interface adapter 7, the film adapter 3 and the power supply coupler 2 will be described below with reference to FIG. 3.

Referring to FIG. 3, the switch 14 is a recording switch for triggering a recording operation, the switch 15 is an erasing switch for triggering an erasing operation, the switch 16 is an N/P switch for carrying out switching between negative-film recording and positive-film recording, and the switch 6 is an illumination ON/OFF switch. A switch 36 is a BLON (Back Light On) switch which operates in association with the illumination ON/OFF switch 6.

Each signal line from the film adapter 3 is connected to the interface adapter 7 via the connector 11, and is in turn connected to the camera body 1 via the cable 9 and the power supply coupler 2. A Y (luminance)+S (sync) signal and a C (chrominance) signal are supplied from the camera body 1 to a mixing circuit 701 through the cable 9, and these signals are added in the mixing circuit 701 and then outputted from the video output terminal 12 as a video signal.

The power supply coupler 2 includes a light receiving sensor 21 for receiving infrared light from the infrared-light wireless remote controller, a one-chip microcomputer 22 capable of selecting, by switching, the function of a serial communication port or the function of a normal output port, and a regulator 23 for supplying electric power to the microcomputer 22. The regulator 23 is controlled by a control signal /CPUON 28 from the camera body 1. More specifically, when the control signal /CPUON 28 goes to its low level, the regulator 23 is enabled to start the operation of the microcomputer 22.

Signals from the switches 14, 15, 16 and 36 are coupled to the microcomputer 22 so that the microcomputer 22 can detect the states of the respective switches 14, 15, 16 and 36.

The light receiving sensor 21 receives infrared light a nd provides a sensor output 24. The microcomputer 22 detects the sensor output 24 and identifies a code transmitted from the wireless remote controller.

Serial communication lines 25, 26 and 27 are connected between the camera body 1 and the microcomputer 22 incorporated in the power supply coupler 2. The line 25 serves as a data line for serial communication, the line 26 serves as a clock line for serial communication, and the line 27 serves as a busy line for serial communication.

The camera body 1 includes a microcomputer 101 for controlling the entire camera body 1 and a serial-to-parallel converter 102 for converting data, which is transmitted from the microcomputer 22 within the power supply coupler 2 by serial communication, into parallel data. Also, the data line 25 is connected to the microcomputer 101 and the serial-to-parallel converter 102.

The camera body 1 also includes regulators 103 and 104 for stably supplying voltage to the microcomputer 101. The regulator 103 permits the microcomputer 101 to operate in a high-speed operation mode, while the regulator 104 permits the microcomputer 101 to operate in a low power consumption mode. The voltage output from the regulator 103 is selected to be higher than that from the regulator 104.

The camera body 1 also includes a voltage selecting switch 105 for switching power supply voltages to be supplied to the microcomputer 101 as required, and an imaging, recording and reproducing block 106 for the SV camera. A video signal from an image-sensing system or a video signal reproduced from a video floppy disk (not shown) is outputted as a Y+S signal and a C (chrominance) signal.

The camera body 1 also includes a character generator 107 consisting of an integrated circuit for displaying an image such as a character on a television monitor (not shown).

When wireless remote control is to be carried out with the above-described arrangement, the microcomputer 101 of the camera body 1 sets the control signal /CPUON 28 to its low level. Thus, the regulator 23 of the power supply coupler 2 is enabled, so that the microcomputer 22 is activated. In this state, the wireless remote controller is made to transmit a desired code to the light receiving sensor 21 provided on the power supply coupler 2.

The microcomputer 22 detects the output from the light receiving sensor 21 to identify the code, thus transmitting data based on the identified code to the serial-to-parallel converter 102 by serial communication. The microcomputer 101 of the camera body 1 fetches the data from the serial-to-parallel converter 102, and controls the camera body 1 on the basis of the fetched data.

Control from the film adapter 3 is also carried out in a manner similar to the above-described manner.

In this case, the microcomputer 22 in the power supply coupler 2 detects the states of the switches 14, 15, 16 and 36 of the film adapter 3, and transmits codes based on the detected states to the camera body 1 by serial communication. Subsequent operations are similar to those described in connection with the wireless remote control.

With the above-described arrangement, it is possible to add both wireless remote control and control through a film adapter while minimizing an increase in the cost of the camera body 1 and an increase in the area required to mount parts on the camera body 1.

The cable 8 of the film adapter 3 is removably connected to the interface adapter 7 via the removable connector 11. Accordingly, if the film adapter 3 is not needed, it may be disconnected so that it does not hinder an operator from operating the camera body 1. Thus, a good operation can be achieved.

In the above-described embodiment, not only is the wireless remote control function added, but the film adapter for film imaging is added to realize an additional function. Instead, a wired remote controller having switches for normal recording and reproduction may also be added to realize an additional function. The wired remote controller is useful in performing photography in a case where infrared light for wireless remote control is difficult to receive, for example, under a bright outdoor condition.

In the above-described embodiment, the microcomputer 22 within the power supply coupler 2 is arranged to directly detect the states of the respective switches and the like. If, for example, the number of switches is large, an extended interface IC or the like for input ports may be incorporated in the power supply coupler 2 so that the states of the switches and the like can be read through the extended interface IC.

In addition, a controller provided with switches and the like may be directly connected to the power supply coupler 2 without the use of the interface adapter 7 or the like.

According to the above-described arrangement, since no light receiving sensor for the wireless remote controller is present in the camera body, power consumption occurring when the camera body is driven with a battery or the like can be reduced. In addition, it is possible to add the wireless remote control function without increasing the space required to mount parts on the camera body.

Further, since the CPU (microcomputer) is incorporated in the power supply coupler, it is possible to easily add the function of detecting the states of inputs at the switches and the like, whereby an SV camera having multiple functions can be implemented.

Another embodiment of the present invention will be described below.

The arrangement of this embodiment is similar to that of the above-described embodiment shown in FIGS. 2 and 3, and detailed description is omitted.

The operation of wireless remote control performed in this embodiment will be described below with reference to FIGS. 4 to 6.

First of all, a communication method executed in this embodiment will be described below. It is assumed that the microcomputer 22 serves as a master side in communication; that is to say, the microcomputer 22 sends out a clock signal to transmit data to the camera body 1 with the data carried on the clock signal. For the sake of simplicity, it is assumed that the data is unidirectionally communicated to the camera body 1. Accordingly, only when the busy line 27 is at its high level, the microcomputer 22 makes the communication lines (DATA, CLK) 25 and 26 active, thereby carrying out communication.

Figure 4:
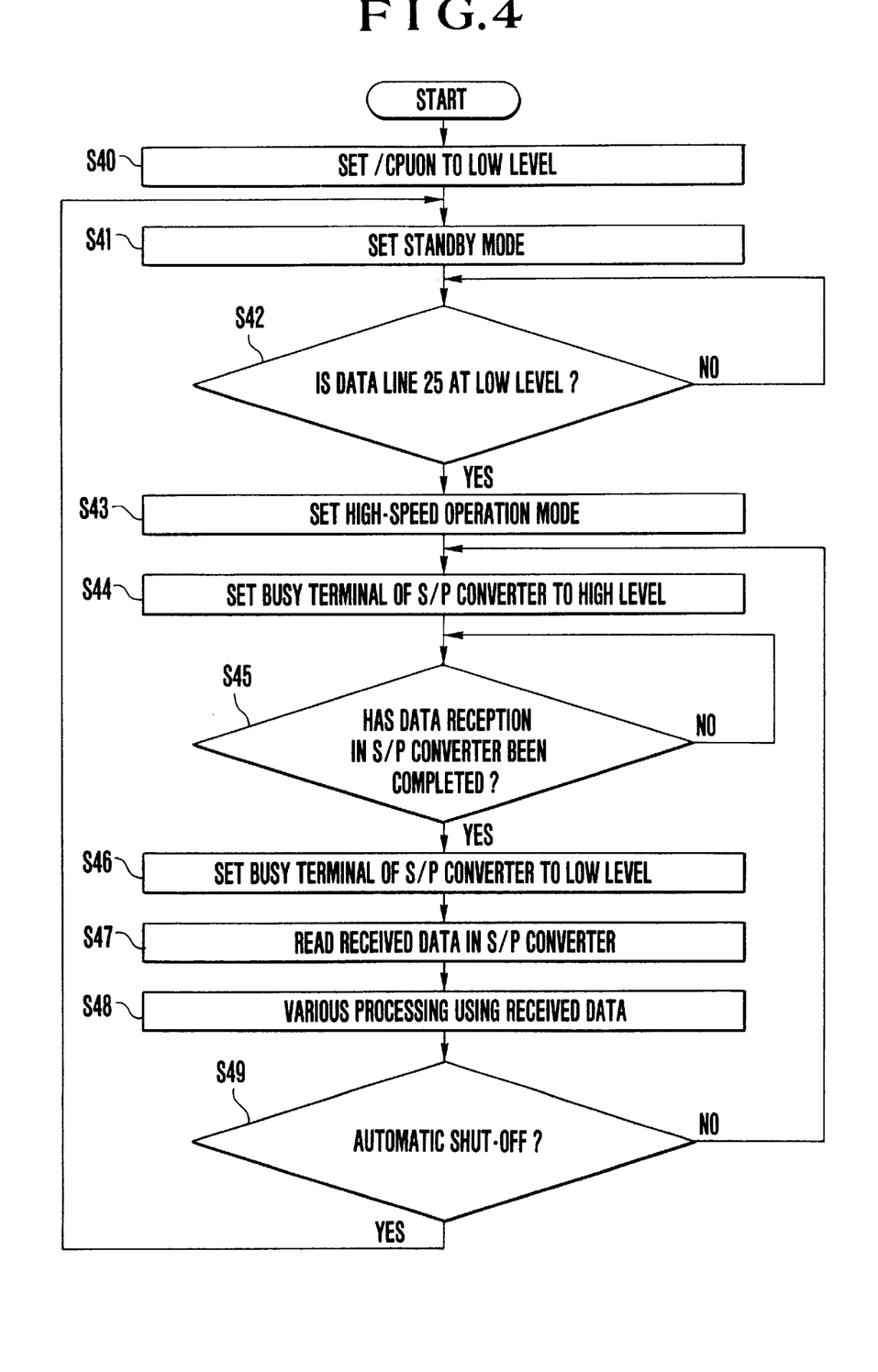
FIG. 4 is an operational flowchart showing a microcomputer 101 in another embodiment of the present invention.

The operation flow of the microcomputer 101 in the camera body 1 at this time is shown in FIG. 4.

In Step S40 of FIG. 4, the control signal /CPUON 28 is set to its low level (refer to the timing shown at S40 in FIG. 6), thereby turning on the regulator 23 to supply electric power to the microcomputer 22. Then, in Step S41, the microcomputer 101 assumes a standby mode and stands ready with its power consumption lowered. In Step S42, the microcomputer 101 determines whether the data line 25 is at its low level (this step is automatically processed through an interrupt by the key-on-wake-up function of a normal microcomputer). If it is determined that the data line 25 is at its low level, the process proceeds to Step S43, where the microcomputer 101 is set to its high-speed operation mode (refer to the timing shown at S43 in FIG. 6). In the high-speed operation mode, the microcomputer 101 is placed in a high-speed operation enable state and is ready for communication.

Figure 6:
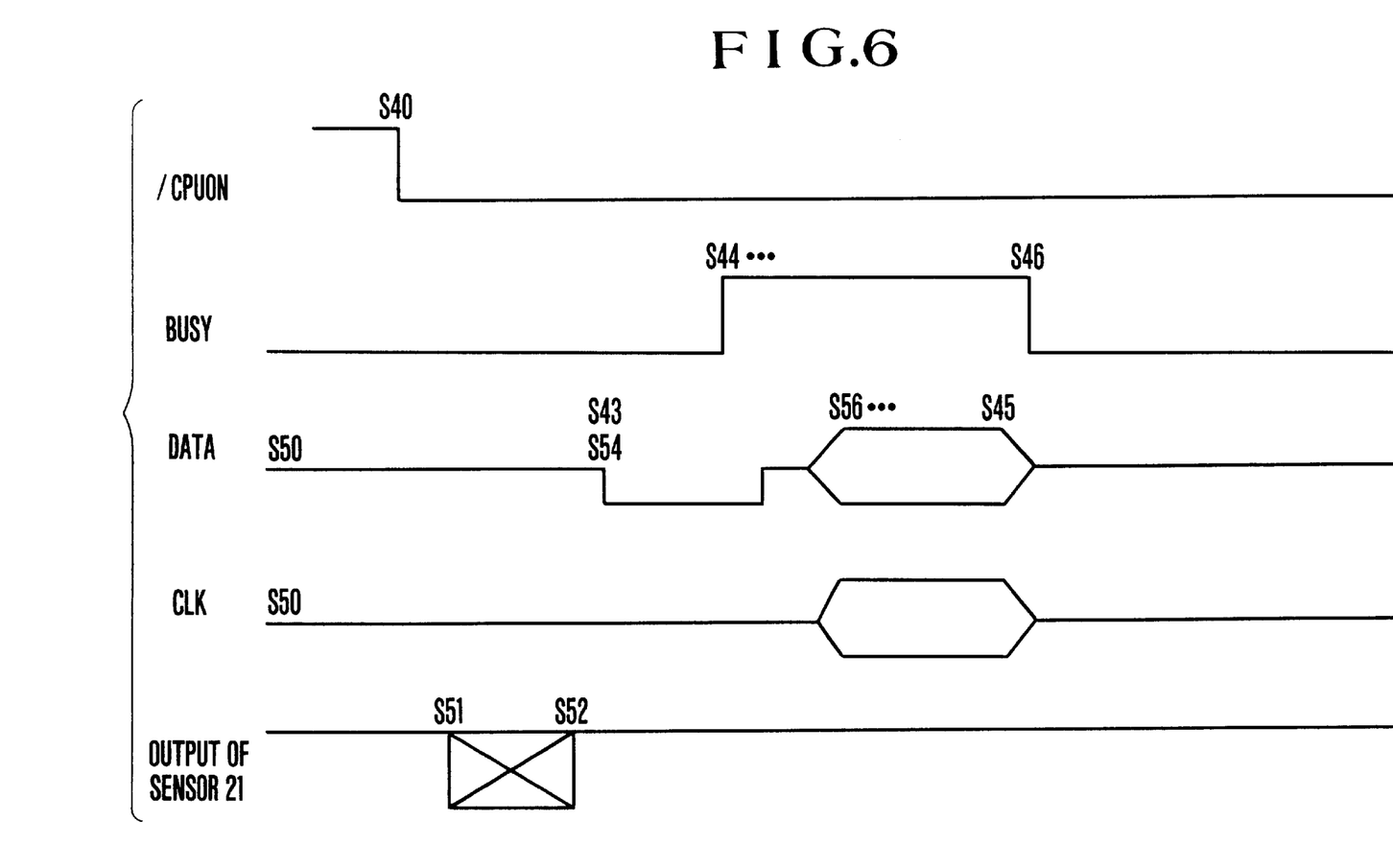
FIG. 6 is a chart showing communication timing in the embodiment of FIG. 4.

Then, in Step S44, the microcomputer 101 sets the busy terminal of the serial-to-parallel (S/P) converter 102 to its high level and informs the microcomputer 22 that communication is ready (refer to the timing shown at S44 in FIG. 6). Then, the microcomputer 22 executes communication and, in Step S45, the reception of data in the S/P converter 102 is completed (refer to the timing shown at S45 in FIG. 6).

Whether the data reception has been completed is automatically determined by counting the number of clocks transmitted over the clock line 26 by means of a counter in the S/P converter 102 (for example, 8 clocks are counted for 8-bit data communication).

Upon completion of the data reception, the microcomputer 101 sets, in Step S46, the busy terminal of the S/P converter 102 to its low level (refer to the timing shown at S46 in FIG. 6). (When the S/P converter 102 finishes receiving the data, the busy terminal may be set to the low level by hardware.) In Step S47, the microcomputer 101 fetches the received data and, in Step S48, executes processing associated with the contents of the data. In Step S49, it is determined whether automatic shut-off is executed (for example, whether the received data is a power-off command, whether the camera remains inoperative for a predetermined time, etc.). If it is determined that automatic shut-off is executed, the process returns to Step S41, where the microcomputer 101 is placed in the standby mode. If it is determined that automatic shut-off is not executed, the process proceeds to Step S44, where the microcomputer 101 is ready for the next communication.

Figure 5:
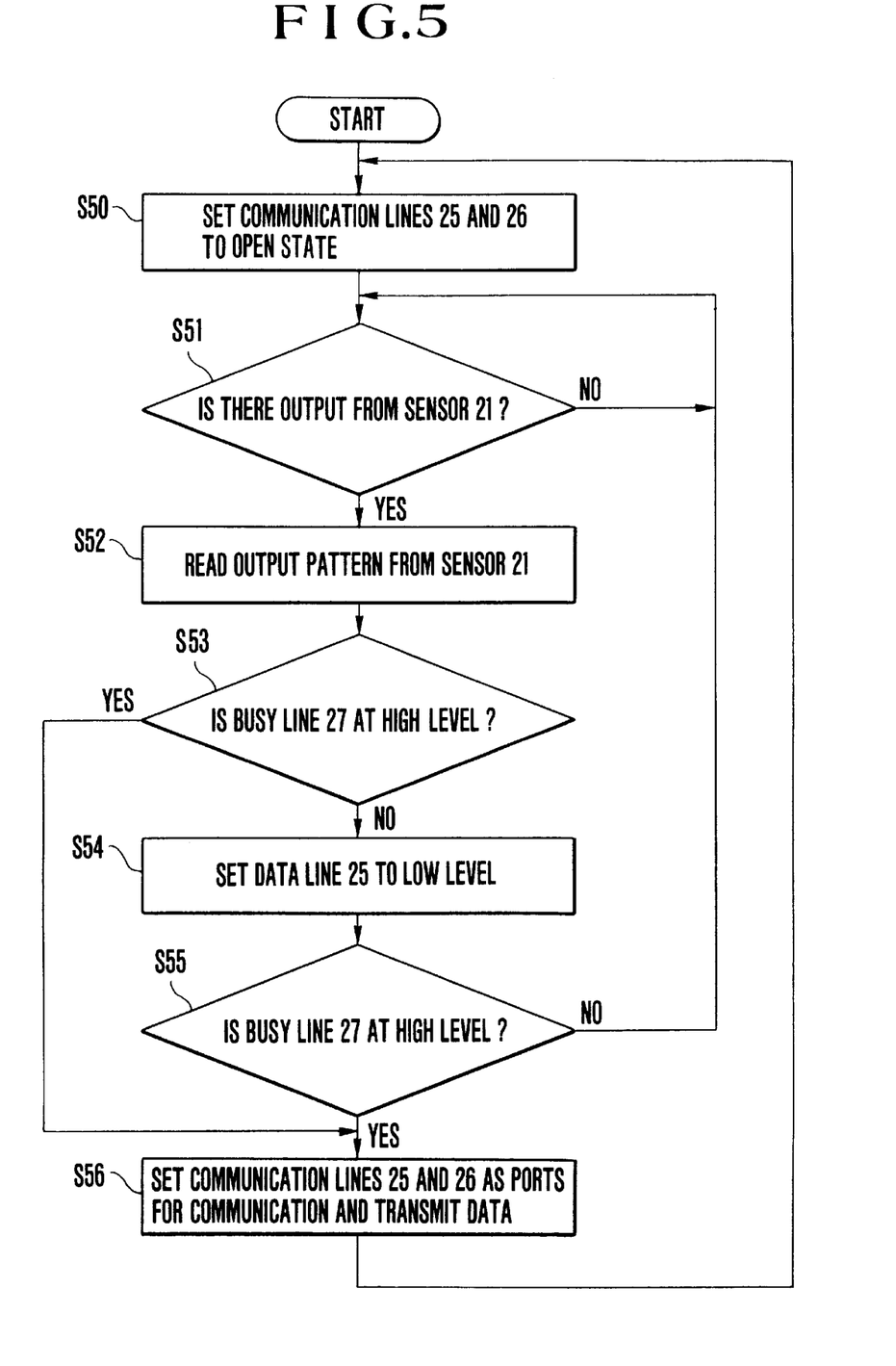
FIG. 5 is an operational flowchart showing a microcomputer 22 in the embodiment of FIG. 4.

If the above-described operation is viewed from the side of the microcomputer 22, the flowchart is represented as shown in FIG. 5.

When electric power is supplied to the microcomputer 22 (/CPUON=low in Step S40 of FIG. 4), the microcomputer 22 initializes the communication lines 25 and 26 in Step S50. In other words, the microcomputer 22 brings its communication ports into an open state. In Step S51 (refer to the timing shown at S51 in FIG. 6), the microcomputer 22 supervises the presence or absence of data transmitted from the wireless remote controller on the basis of the output of the light receiving sensor 21, waiting for a signal to be received from the wireless remote controller. If a signal is received from the wireless remote controller as indicated by the timing shown at S51 in FIG. 6, the process proceeds to Step S52, where the microcomputer 22 reads the pattern of the signal received from the wireless remote controller and interprets it as a code. In Step S53, the microcomputer 22 determines whether the busy line 27 is at the high level, that is, whether the camera body 1 is ready for reception. If the busy line 27 is not at the high level, the microcomputer 22 sets, in Step S54, the data line 25 to the low level as a request for communication. In Step S55, the microcomputer 22 waits for the busy line 27 to again go to the high level. If it is determined in Step S53 or S55 that the busy line 27 is at the high level, the microcomputer 22 sets the communication lines 25 and 26 as ports for communication and then transmits data over the communication lines 25 and 26 (refer to the timing shown at S56 in FIG. 6). If it is determined in Step S55 that the busy line 27 is not at the high level, the microcomputer 22 returns to Step S51 in order to wait for the next command to be transmitted from the wireless remote controller.

In the above-described arrangement, if there is no need for communication, the camera body 1 is placed in a standby state so that power consumption can be reduced. In addition, since the state of the data line for communication is utilized as a trigger signal for changing the camera body 1 from the standby state to an operating state, the number of connection lines between the camera body 1 and the power supply coupler 2 can be reduced, whereby a coupling connector can be miniaturized.

In addition, since the state of the data line is utilized as a signal for changing the microcomputer 101 of the camera body 1 from the standby state to the operating state, the state of the clock line required for communication can be used instead.

In the above-described embodiment, communication is carried out only unidirectionally from the microcomputer 22 of the power supply coupler 2 to the microcomputer 101 of the camera body 1. However, bidirectional communication may be performed.

Although the communication method in the above-described embodiment is of a clock synchronous type, it may be of an asynchronous type. Other procedures such as handshaking in communication in the above-described embodiment are for the purposes of illustration only, and are not limited to those used in the above-described embodiment.

Although in the above-described embodiment the serial-to-parallel converter 102 is incorporated in the camera body 1, the microcomputer 101 in the camera body 1 and the microcomputer 22 in the power supply coupler 2 may exchange data directly by serial communication.

The aforesaid embodiment has been described with reference to only the function of the wireless remote controller for simplification of explanation, but the function of the film adapter 3 and so on is also subject to similar handshaking. In this case, it is sufficient to substitute the detection of the states of the switches of the film adapter 3 for the detection of light received from the wireless remote controller.

As is apparent from the foregoing description, the communication lines between a body and an accessory device can be used for control of the operation of a microcomputer of the body or that of a microcomputer of the accessory device. Accordingly, it is possible to add various functions, such as wireless remote control, and also to reduce power consumption without increasing the number of connection lines between the body and the accessory device.

What is claimed is:

1. An imaging system, comprising:

an imaging device for imaging an object and obtaining an image signal, said imaging device comprising a first microcomputer for controlling an operation of said imaging device, said imaging device having a normal operation mode and a low power consumption mode requiring a lower power consumption than the normal operation mode;

a peripheral device comprising a second microcomputer and input means for inputting a command indicating the operation of said imaging device; and communication lines for communicating information signals between said first and second microcomputers, said communication lines communicating between said first and second microcomputers signals indicating the operation of said imaging device, a part of the communication lines having a first state in which said part of the communication lines is capable of transmitting the information signals between said first and second microcomputers and a second state in which said part of the communication lines is incapable of transmitting the information signals between said first and second microcomputers, said first microcomputer discriminating the state of said part of the communication lines and changing an operation mode of said imaging device between the low power consumption mode and the normal operation mode according to the discrimination result, said second microcomputer changing the state of said part of the communication lines from the second state to the first state in response to inputting of the command into said peripheral device so as to change the operation mode of said imaging device from the low power consumption mode to the normal operation mode.

2. An imaging apparatus for imaging an object, said imaging apparatus communicating with a peripheral device, which has a second microcomputer, for inputting a command indicating an operation of said imaging apparatus and controlling said imaging apparatus, by using communication lines, said imaging apparatus comprising:

imaging means for imaging the object and obtaining an image signal; and a first microcomputer for controlling an operation of said imaging apparatus, said communication lines communicating information signals between said first and second microcomputers, said communication lines communicating between said first and second microcomputers signals indicating the operation of said imaging apparatus, a part of the communication lines having a first state in which said part of the communication lines is capable of transmitting the information signals between said first and second microcomputers and a second state in which said part of the communication lines is incapable of transmitting the information signals between said first and second microcomputers, said imaging apparatus having a normal operation mode and a low power consumption mode requiring a lower power consumption than said normal operation mode, said first microcomputer discriminating the state of said part of the communication lines and changing an operation mode of said imaging apparatus between the low power consumption mode and the normal operation mode according to the discrimination result, said second microcomputer changing the state of said part of the communication lines from the second state to the first state in response to inputting of the command into said peripheral device so as to change the operation mode of said imaging apparatus from the low power consumption mode to the normal operation mode.

3. An apparatus according to claim 1, wherein the communication lines are serial communication lines.

4. An apparatus according to claim 3, further comprising serial to parallel conversion means for converting the information signal transmitted through the communication lines from serial data to parallel data, said first microcomputer receiving the parallel data from said conversion means.

5. An apparatus according to claim 2, further comprising power supply means for selectively supplying a first voltage and a second voltage higher than the first voltage to said first microcomputer, said power supply means supplying the first voltage to said first microcomputer in the low power consumption mode and the second voltage to said first microcomputer in the normal operation mode.

6. An apparatus according to claim 1, wherein the communication lines transmit the image signals obtained by said imaging means.

7. An apparatus according to claim 1, further comprising recording means for recording the image signals.

8. An apparatus according to claim 7, wherein said recording means records the image signals as a still image.

9. An apparatus according to claim 1, wherein said first state is a low state and said second state is an open state.

10. A control apparatus for controlling an imaging apparatus, which has a first microcomputer for controlling an operation of said imaging apparatus, for imaging an object to obtain an image signal, by using communication lines, said apparatus comprising:

input means for inputting a command indicating the operation of said imaging apparatus; and a second microcomputer, said communication lines communicating information signals between said first and second microcomputers, said communication lines communicating between said first and second microcomputers signals indicating the operation of said imaging apparatus, a part of the communication lines having a first state in which said part of the communication lines is capable of transmitting the information signals between said first and second microcomputers and a second state in which said part of the communication lines is incapable of transmitting the information signals between said first and second microcomputers, said imaging apparatus having a normal operation mode and a low power consumption mode requiring a lower power consumption than said normal operation mode, said first microcomputer discriminating the state of said part of the communication lines and changing an operation mode of said imaging apparatus between the low power consumption mode and the normal operation mode according to the discrimination result, wherein said second microcomputer changes the state of said part of the communication lines from the second state to the first state in response to inputting of the command into said input means so as to change the operation mode of said imaging apparatus from the low power consumption mode to the normal operation mode.

11. An apparatus according to claim 10, wherein said communication lines are serial communication lines.

12. An apparatus according to claim 10, wherein said communication lines transmit the image signal obtained by said imaging apparatus.

* * * * *

UNITED STATES PATENT AND TRADEMARK OFFICE
CERTIFICATE OF CORRECTION

PATENT NO. : 5,923,373
DATED : July 13, 1999
INVENTOR(S) : Nobuo Fukushima

It is certified that error appears in the above-identified patent and that said Letters Patent is hereby corrected as shown below:

Col. 8, line 42, delete "1" and insert -- 2 --.
Col. 8, line 56, delete "1" and insert -- 2 --.
Col. 8, line 59, delete "1" and insert -- 2 --.
Col. 8, line 63, delete "1" and insert -- 2 --.

Signed and Sealed this

Nineteenth Day of September, 2000

Q. TODD DICKINSON

Attest:

Attesting Officer

Director of Patents and Trademarks